United States Patent
Cowgill et al.

[11] Patent Number: 5,694,711
[45] Date of Patent: Dec. 9, 1997

[54] SIGN WITH FANNING FRAMEWORK

[75] Inventors: John H. Cowgill, Otis; Charles W. Elroy, Jr., Depoe Bay, both of Oreg.

[73] Assignee: Sportniks, Inc., Depoe Bay, Oreg.

[21] Appl. No.: 743,022

[22] Filed: Nov. 4, 1996

Related U.S. Application Data

[62] Division of Ser. No. 252,232, Jun. 1, 1994, Pat. No. 5,598,654.

[51] Int. Cl.$^6$ .................................................. G09F 21/02
[52] U.S. Cl. .................................................. 40/610; 40/586
[58] Field of Search .................... 40/610, 612, 586; 404/6, 9, 10; 116/173, 63 P

[56] References Cited

U.S. PATENT DOCUMENTS

| | | | |
|---|---|---|---|
| 403,698 | 5/1889 | Rector . | |
| 2,732,823 | 1/1956 | Hanson | 116/173 |
| 2,819,547 | 1/1958 | Clements | 40/610 |
| 2,887,983 | 5/1959 | Budd | 116/63 P |
| 3,200,786 | 8/1965 | Swezy et al. | 40/610 X |
| 3,526,200 | 9/1970 | Doyle | 116/173 X |
| 3,922,998 | 12/1975 | May | 116/63 P X |
| 4,103,445 | 8/1978 | Smith et al. . | |
| 4,490,934 | 1/1985 | Knapp | 40/610 X |
| 4,759,606 | 7/1988 | McDowell | 404/6 X |
| 4,986,016 | 1/1991 | Wichman | 40/610 |
| 5,197,408 | 3/1993 | Stoudt | 116/173 |
| 5,276,424 | 1/1994 | Hegemann | 40/586 X |

FOREIGN PATENT DOCUMENTS

| | | | |
|---|---|---|---|
| 11527 | 5/1906 | United Kingdom | 116/173 |

*Primary Examiner*—Joanne Silbermann
*Attorney, Agent, or Firm*—Robert D. Varitz, P.C.

[57] ABSTRACT

A collapsible sign (20) includes a frame (26) having a hub (30) and plural arms (42, 44, 46, 48, 50) extending therefrom. A web (28) is disposed over the frame (26) and is secured thereto. A support (52) for the sign is attached to at least one of the arms of the frame. At least some of the arms (42, 44, 46, 50) include a hinge element (42H, 44H, 46H, 50H) which is rotatably mounted about a pivot point (38P, 40P) on the hub. The arms may be divided into web-support arms (46, 48, 50) and sign-support arms (42, 44), wherein the sign-support arms may be fixed to a handle (53) or other standard for support the sign. The sign-support arms may also double as web-support arms in aiding to support the web in an expanded condition. In some instances, one of the arms (48) may be fixed to the hub in a non-rotatable condition. The web may be either fully-attached to the frame, or may be partially attached thereto. The web may include some type of reflective device or some type of illuminated device (196) for further calling attention to the sign. The sign web may be one or two sided.

18 Claims, 4 Drawing Sheets

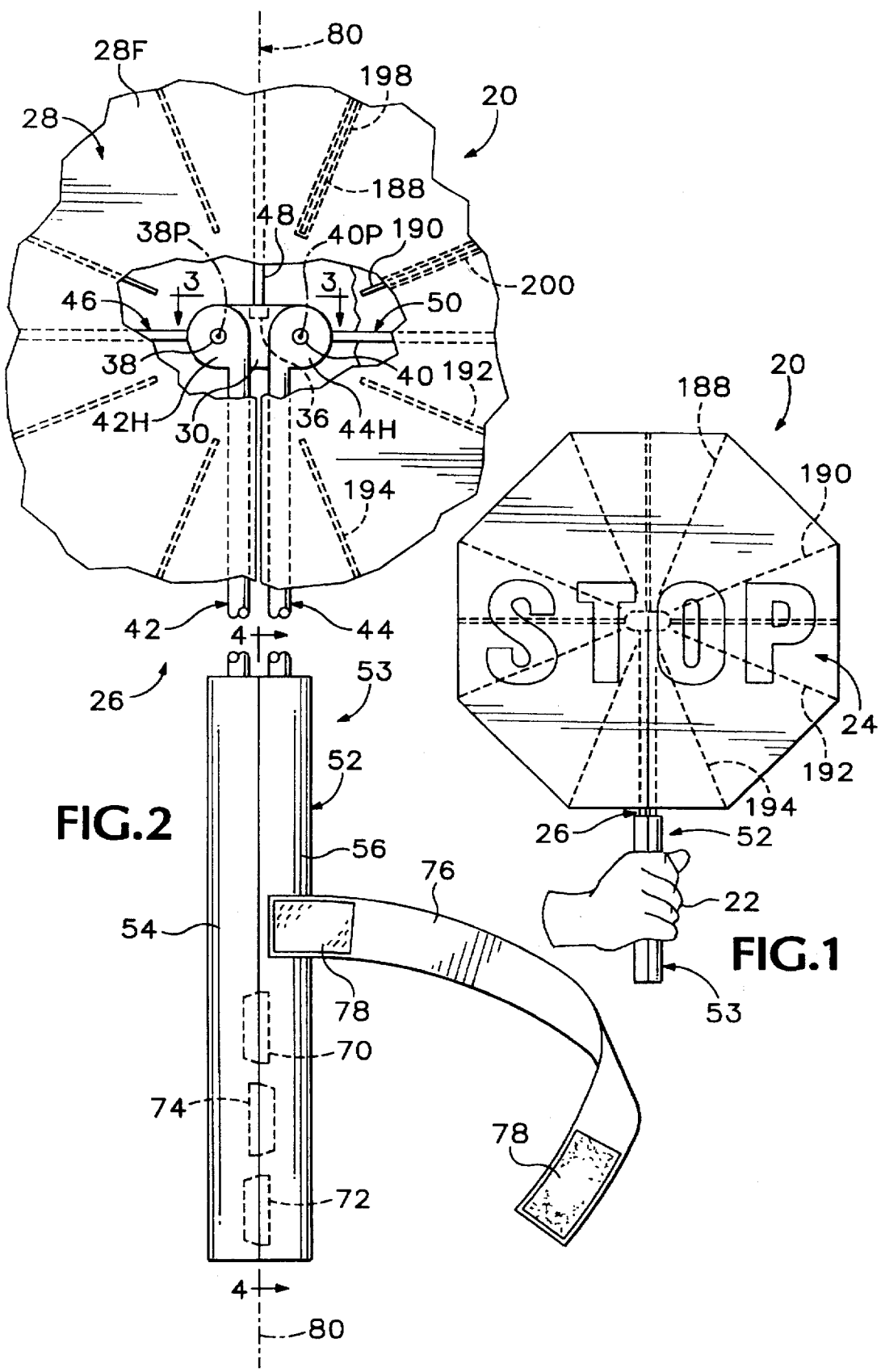

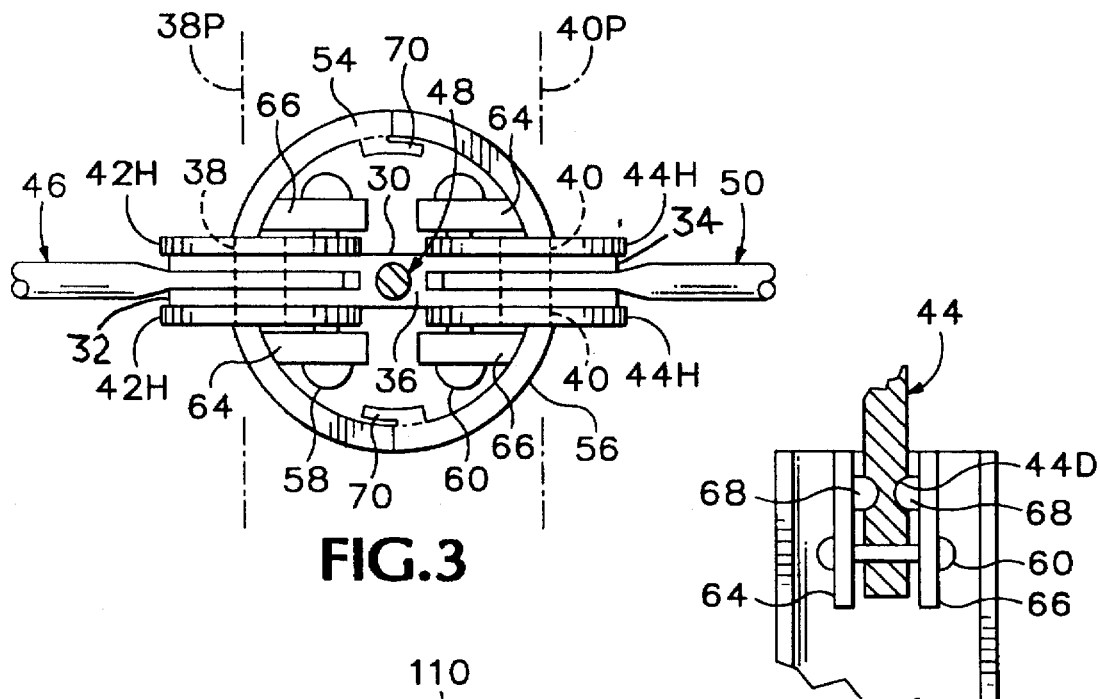
FIG.3
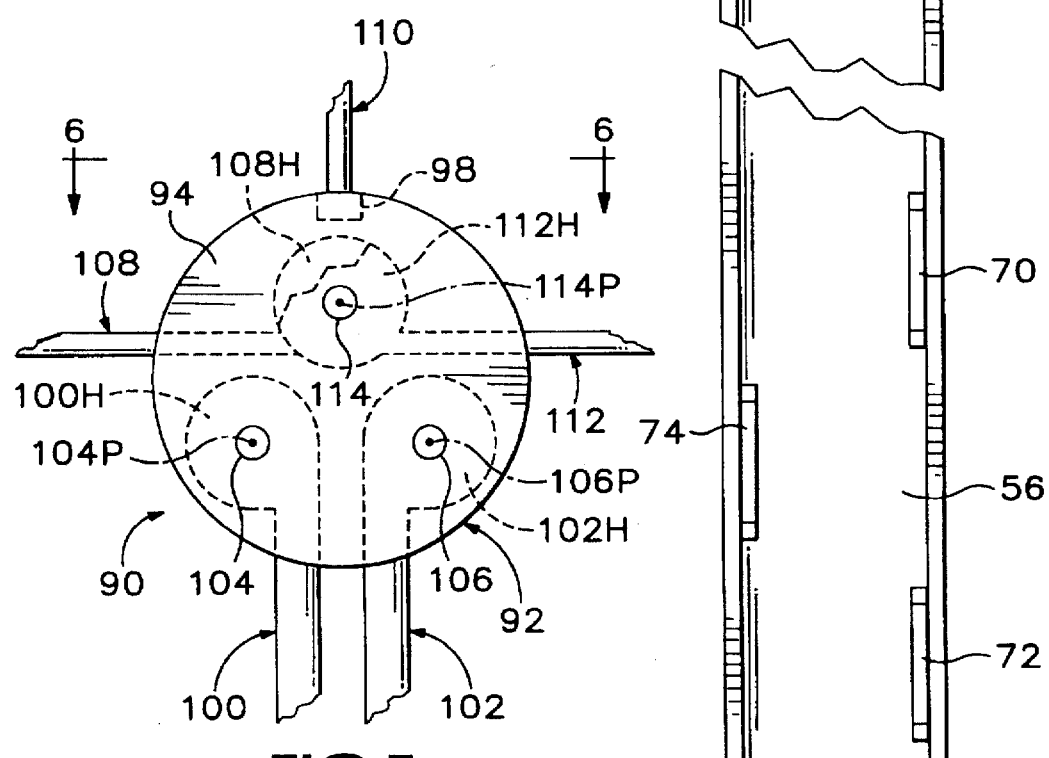
FIG.5
FIG.4

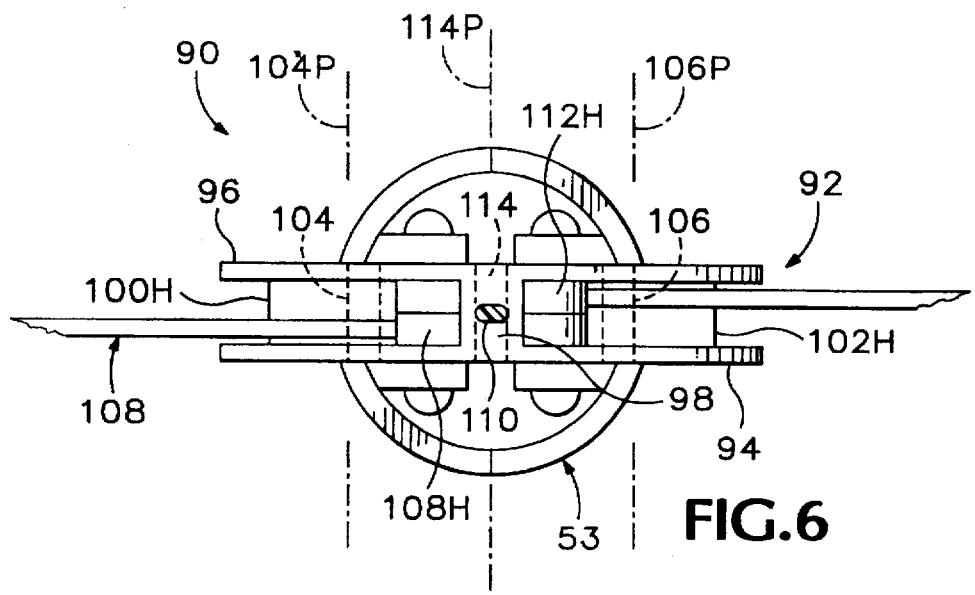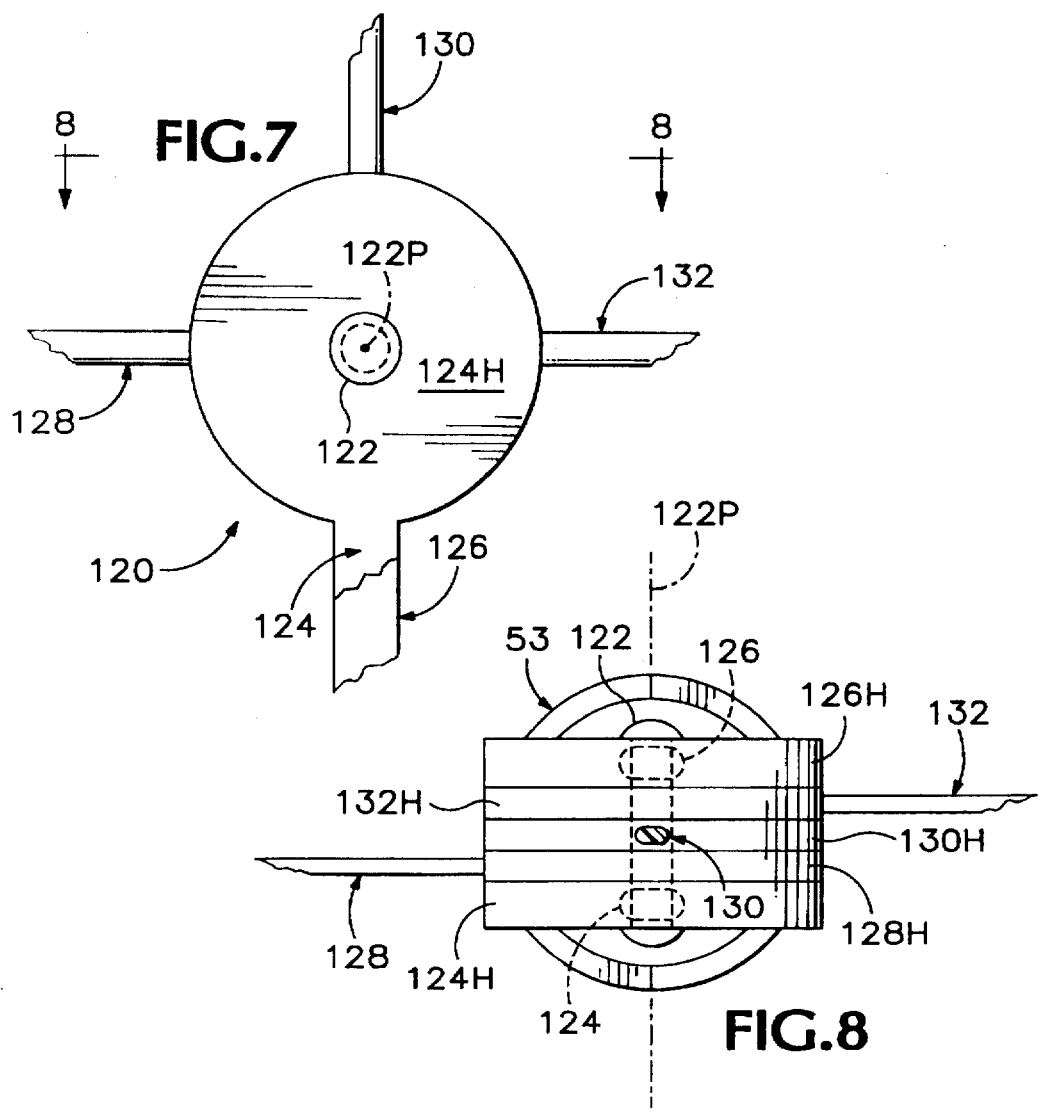

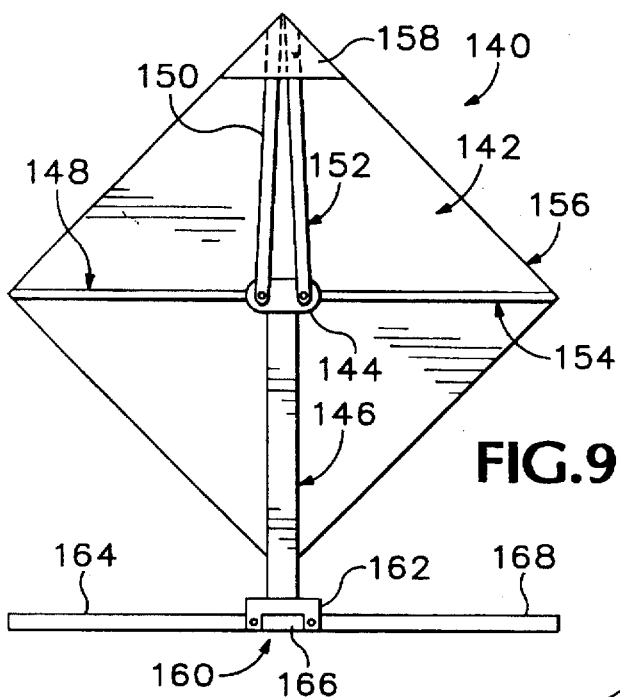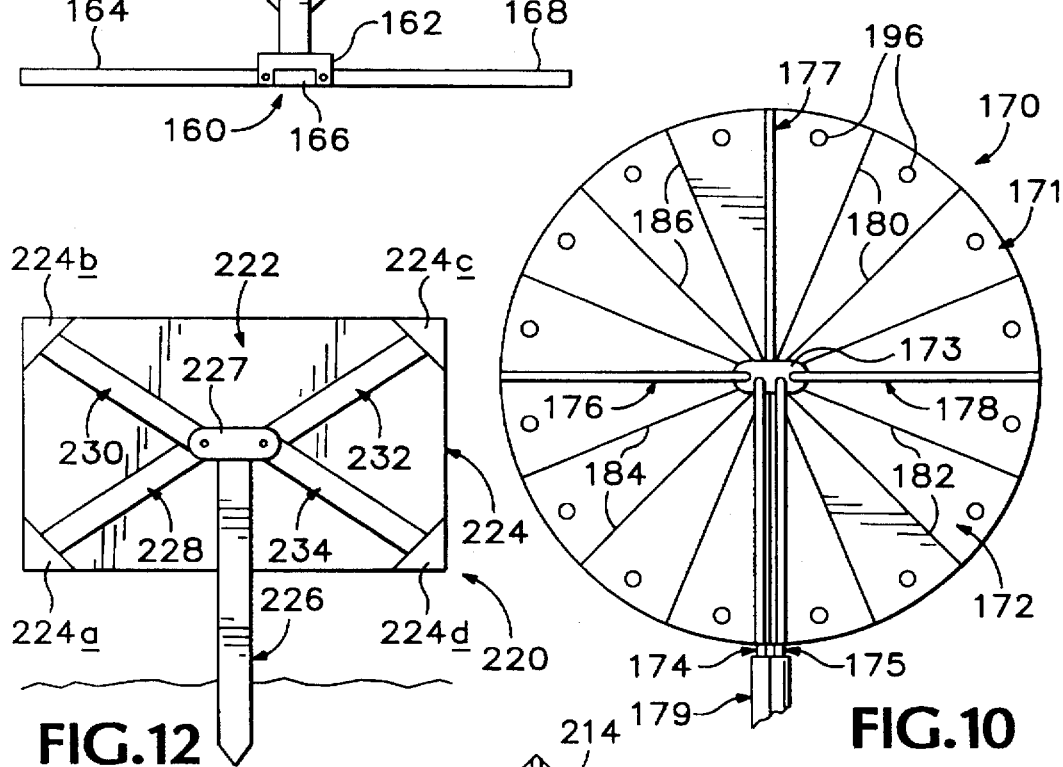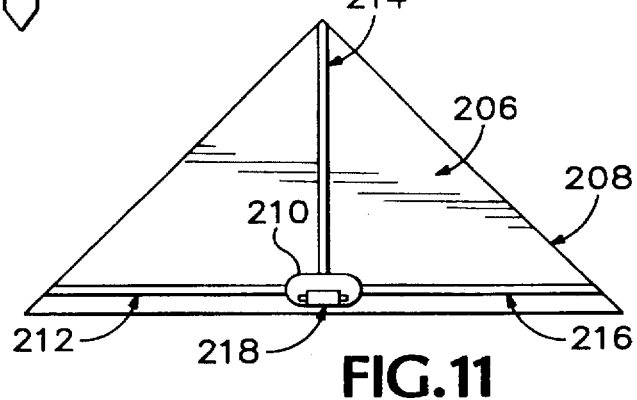

SIGN WITH FANNING FRAMEWORK

RELATED APPLICATIONS

This is a Division of application Ser. No. 08/252,232, for SIGN WITH COLLAPSIBLE, FANNING FRAMEWORK, Filed Jun. 1, 1994, now U.S. Pat. No. 5,598,654, granted Feb. 4, 1997.

TECHNICAL FIELD

This invention relates to signs and more particularly to a sign which has a fan-like frame with a web disposed there over which may be collapsed and rolled up for easy storage and transportation.

BACKGROUND ART

Temporary signs are in use worldwide. Such signs are used to provide direction for traffic, to provide notice that property is for sale or lease, or to provide any other type of information to the passer by. Because of the temporary nature of such signs, it is necessary that they be transportable with a minimum amount of effort and inconvenience. To this end, a large variety of collapsible and/or folding signs have been developed.

In the field of highway signs, one such sign is disclosed in U.S. Pat. No. 5,152,091 to Leach. This sign utilizes a fabric web over a metal frame having a pair of arms which are pivoted at their midpoints. Once the arms are extended, the fabric web is stretched over the frame and secured to the ends of the arms. This sign is then placed in a stand which provides support therefor.

Ross, U.S. Pat. No. 3,847,335 discloses a folding portable sign standard which again has a pair of mutually-pivoting supports for the sign and a base, all of which may be folded into a relatively compact structure suitable for transportation and storage.

U.S. Pat. No. 4,541,190 to Weiner et al discloses a folding sign which may have a variety of messages or instructions printed thereon, and which folds to a compact state for storage and transportation.

Culp et at, U.S. Pat. No. 4,980,984 discloses yet another type of sign which may have its framework folded up and encased within the message-bearing web for transportation and storage.

Other forms of collapsible signs are disclosed in U.S. Pat. No. 4,875,302 to Knoffsigner, which discloses a foldable frame and a web stretched there over, wherein the web forms a backing to which a sign may be attached.

U.S. Pat. No. 4,817,319 to Vitale and U.S. Pat. No. 4,866,866 to Rotter et al both disclose signs which may be collapsed and which may be sunk into the ground to provide various types of notices.

Another type of sign that is frequently seen along the highways is the STOP/SLOW sign used by highway workers to control traffic through a construction area. Such a sign is typically nothing more than a conventional metal 18- or 24-inch wide octagonal "STOP" sign, as is used at fixed stop sign locations, with a "SLOW" warning on the reverse side thereof. The sign may be turned side-for-side depending on whether the highway worker desires oncoming traffic to stop or to merely proceed at a slower pace. Such signs generally have a handle thereon which is grasped by the highway worker, or may be mounted on a pole which is rested on the ground. As may be expected, such a sign is usually quite heavy, particularly if it is required to be held for some time by a highway worker.

One of the problems associates with temporary signs occurs during inclement weather conditions, particularly during high winds. Temporary signs will often be rotated or knocked over by the wind, or, if the flexible web over a temporary sign is not property supported, the web will billow, thereby producing an air foil which further aggravates the problem which may cause the sign to "kite."

One of the disadvantages of known collapsible signs is that the web is generally detached from the sign for storage purposes. Thus, the web over the sign is constantly being removed and applied to the framework, thereby causing wear on the web and inconvenience to the workers who are placing the signed, as additional steps are required in order to ready the sign for use.

DISCLOSURE OF THE INVENTION

The sign of the invention includes a frame having a hub and plural arms extending therefrom. A web is disposed over the frame and is secured thereto. A support for the sign is attached to at least one of the arms of the frame. At least some of the arms include a hinge element which is rotatably mounted about a pivot point on the hub. The arms may be divided into web-support arms and sign-support arms, wherein the sign-support arms may be fixed to a handle or other standard for supporting the sign. The sign-support arms may also double as web-support arms to further support the web in an expended condition. In some embodiments, one of the arms may be fixed to the hub in a non-rotatable condition. The web may be either fully-attached to the frame, or may be partially attached thereto. The web may include some type of reflective device or some type of illuminated device for further calling attention to the sign. The sign web may be one or two sided.

It is an object of the invention to provide a sign which may be easily collapsed for storage and transportation.

Another object of the invention is to provide a sign which is lightweight and easily handled by a worker.

A further object of the invention is to provide a sign which includes a web disposed over a collapsible frame, wherein the web is permanently secured to the frame, at least over a portion of its expanse.

Still another object of the invention is to provide a frame for a sign which may have a web easily installed thereon.

These and other objects and advantages of the invention will become more fully appreciated as the description which follows is read in connection with the drawings.

BRIEF DESCRIPTION OF THE DRAWINGS

FIG. 1 is a front elevation of a sign constructed according to the invention.

FIG. 2 is an enlarged representation of FIG. 1, with portions thereof broken away to show details of the construction of the sign.

FIG. 3 is a top-section view of the hub of the sign, taken generally along line 3—3 of FIG. 2.

FIG. 4 is a medial elevation of a handle of the invention, taken generally along the line 4—4 of FIG. 2.

FIG. 5 is a front elevation of an alternate embodiment of a hub of the sign.

FIG. 6 is a top section of the hub, taken generally along the line 6—6 of FIG. 5.

FIG. 7 is a front elevation of an alternate embodiment of a hub of the sign.

FIG. 8 is a top section of the hub, taken generally along the line 6—6 of FIG. 7.

FIGS. 9, 10, 11 and 12 depict alternate embodiments of the sign and the frame and web therefor.

BEST MODES FOR CARRYING OUT THE INVENTION

Referring to FIGS. 1 and 2, a sign constructed according to the invention is depicted generally at 20. The embodiment of the sign depicted at 20 is configured as an octagonal STOP sign, as might be used by a worker on a road-construction project, wherein the worker, whose hand is depicted at 22, is required to hold sign 20 in order to direct traffic. The letters, or indicia shown generally at 24 in this figure depict the word "STOP". The word "SLOW" may be displayed on the other side of the sign, which is rotated to direct traffic.

Sign 20 includes a frame, depicted generally at 26, and a web, depicted generally at 28. Web 28 is secured to frame 26, at least over a portion of its expanse and may provide signage on one or both sides thereof, as noted above. The details of construction of web 28 will be further explained later herein.

Referring now to FIGS. 2, 3 and 4, the first embodiment of frame 26 of sign 20 will be explained in detail. Frame 26, in this embodiment includes a hub 30, which includes a pair of opposed, spaced-apart sides 32, 34. Hub 30 further includes a bridge element 36 which joins sides 32, 34 along a stretch of the top edges thereof. Pivot means in this embodiment take the form of pins or rivets 38, 40 which define pivot points 38P, 40P, respectively. The frame for the sign of the invention may be constructed of suitable material, such a light-weight metal, or plastic, or other polymer material. The frame elements may be forged or molded according to the desires of the builder.

Plural arms, depicted at 42, 44, 46, 48 and 50, radiate from hub 30. Arms 42 and 44 are what are referred to herein as sign-support arms, while arms 46, 48 and 50 are what are referred to as web-support arms. Web-support arm 48 is fixed to hub 30 on bridge 36 and does not move relative to hub 30, while web-support arms 46 and 50 each contain hinge elements 46H, 50H, respectively. The hinge elements are rotatably mounted about pivot points 38P, 40P, respectively, as pivot means 38, 40, are operable to received the hinge elements. Pivot means, in this embodiment, comprise pins or rivets which extend through the hinge element and hub. Hinge elements 42H, 44H are also present on sign-support arms 42, 44, respectively. In this embodiment, the hinge elements for sign support arms 42, 44 take a saddle-like form, and engage hub 30 on either side thereof. Also, in this embodiment, sign-support arms 42, 44 also support web 28.

Sign-support arms 42, 44 engage a sign support depicted generally at 52. In this particular embodiment, sign support 52 takes the form of a handle 53, which is formed of two pieces, or elements, 54 and 56. One of the handle elements is shown in detail in FIG. 4 as being attached to sign-support arm 44.

Referring now to FIGS. 3 and 4, handle elements 54, 56 are secured to sign-support arms 42, 44 by means of pins 58, 60, respectively. Detail is shown in FIG. 4 for handle element 56 as including an arm receiver shown generally at 62. Receiver 62 is formed of two spaced-apart receiver elements 64, 66, which receive pin 60 therethrough. Sign-support arm 44 includes a detent 44D. Handle element 56 is secured in an extended position to arm 44 by the interaction of detent 44D and nubs 68, which are constructed to be yieldable, thereby allowing sign-support arm 44 to be locked in place for normal use, while permitting easy displacement from a locked, extended condition, to a folded, collapsed condition. Handle element 56 includes, in the preferred embodiment, three lugs, shown at 70, 72 and 74, which, as depicted in FIG. 2, are seen to be conformal with one another to provide a locking arrangement for handle elements 54 and 56 to maintain them in alignment with one another. In this embodiment, handle elements 54, 56 are identically formed structures, which reduced manufacturing costs. A strap 76 is provided and is secured to one of the handle elements. The strap may be wrapped about handle 53 and secured with hook-and-loop fastener elements 78 to maintain sign 20 in an opened position.

An important feature of the sign of the invention is that the sign may be collapsed to a compact dimension for storage and transportation. In the embodiment depicted in FIGS. 1-4, web 28 is split adjacent sign support arms 42, 44, the split being depicted generally at 80. This allows sign-support arms 42 and 44, along with handle elements 54 and 56, to be rotated about pivot points 38P, 40P which brings arms 42, 44, 46 and 50 into parallel alignment with fixed arm 48. Handle elements 54, 56 may then be folded about pins 58, 60 to encompass the now-collapsed web and the folded frame. Handle 53 may be sized, in the case of small hand-held signs, so that the handle will serve as a case for the collapsed sign. The collapsed sign may be secured within handle/carrying case 52 by once again securing strap 76 about the periphery of the handle elements.

Split 80 defines what is referred to herein as a hub/web midline. In the embodiment depicted in FIGS. 1-4, the hinge elements for the web-support arms and the sign-support arms on one side of the midline share a single pivot point on the hub while the hinge elements for the web-support arms and sign-support arms on the other side of the midline share a second pivot point. It should also be noted that some of the arms are offset from their respective hinge elements. In this embodiment, sign-support arms 42 and 44 are offset from their hinge elements, which means that the longitudinal axis of an arm does not pass through the pivot point about which the hinge element rotates. This configuration is used so that the offset arms will extend parallel to one another without having an appreciable gap therebetween. Of course, the hinge elements may be sized so that they are in fact no larger than the arms, depending on the material selected for the frame. In the case of a metal, such as aluminum or steel, the hinge elements probably have sufficient strength when constructed to relatively small size to perform their intended purpose. In the case where the frame is formed out of a polymer or other plastic-type material it may be necessary to enlarge the hinge elements to provide sufficient strength for the frame.

Referring now to FIGS. 5 and 6, a second embodiment of the frame is depicted generally at 90. As with the first-described embodiment, the choice of material and the construction of frame elements is left to the builder and depends on the use to which the sign will be put. Web 28 is omitted from these figures to simplify the drawings. Frame 90 includes a circular hub 92, which again has spaced-apart sides 94, 96 and a bridge 98 extending between the sides. Sign-support arms 100 and 102 each include hinge elements 100H, 102H, which pivot about pins, or pivot means 104 and 106, respectively. Pins 104 and 106 each define a pivot point 104P, 106P, respectively. As is shown in FIG. 5, the hinge elements from sign-support arms 100, 102 are both offset from their respective arms.

Web-support arms in this embodiment are shown at 108, 110 and 112, with arms 108, 112 each having hinge elements 108H, 112H, respectively, which are rotatably mounted on a pin 114, defining a pivot point 114P, which also defines the location of the hub/web midline in this embodiment, which midline extends through pivot point 114P and runs parallel to arm 110. Arm 110 is non-rotatably fixed to bridge 98 in this embodiment. As is shown in FIGS. 5 and 6, the hinge elements for the web-support arms share a pivot point, and the hinge elements for the sign-support arms are rotatably mounted about other pivot points.

Turning now to FIGS. 7 and 8, a frame 120 which is constructed according to a third embodiment, is shown. In this embodiment, a hub 122 comprises a single pin having a pivot point 122P extending along with longitudinal axis thereof. Sign-support arms 124, 126 each include hinge elements 124H, 126H which are rotatably mount on pin 122. Web-support arms 128, 130 and 132 all have their respective hinge elements 128H, 130H and 132H. In this configuration, the arms are not offset on their hinge elements, and a fixed arm is not included. Sign-support arms 124 and 126 each connect with a handle 152.

Turning now to FIG. 9, another embodiment of the sign is depicted generally at 140. This embodiment depicts a diamond-shaped highway warning sign, and includes a frame 142 having a hub 144. In this embodiment, a sign-support arm 146 is a single structure which is non-rotatably fixed to hub 144. Web-support arms 148, 150, 152 and 154 all extend from hub 144 to support web 156. In this embodiment, web 156 is secured to arms 146, 148 and 154. A pocket 158 is formed at the upper corner at web 156 and receives arms 150, 152 therein. Arms 150 and 152, in this embodiment, are made of a flexible material so that they may be deformed, so as to be captured in pocket 158, and will then return to their original shape. Sign-support arm 146 is attached to a stand 160 which include a base 162 and legs 164, 166 and 168. The construction of base 162 is believed to be well within the ability of one of ordinary skill in the art. The hub/web midline in this embodiment extends through hub 144 and extends parallel to the longitudinal axis of sign-support arm 146.

In order to collapse sign 140, sign-support arms 150, 152 are removed from pocket 158 and the upper expanse of web 156 is allowed to fold along outstretched web-support arms 148, 154. The web-support arms are all folded to extend parallel to sign-support arm 146. The web is rolled about the folded arms of the frame, and the legs are then folded over the upper portion of the sign. The sign may then be placed in a suitable container for transport and storage, or a strap may be provided (not shown) to retain the sign in a collapsed condition. As shown in FIG. 9, sign 140 is generally constructed with a fabric web on one side only thereof, although the web sandwich previously described may also be used to form a two-sided sign.

A round sign is depicted generally at 170 in FIG. 10. A frame 172 is constructed similarly to frame 26 and includes a hub 173, sign-support arms 174, 175 which are attached to a handle 179, and web-support arms 176, 177 and 178. As sign 170 has a circular configuration, the sign includes a number of struts, such as those depicted at 180, 182, 184 and 186. The struts in the sign are fully supported by the web and do not contact the frame. Such struts are also depicted at 188, 190, 192 and 194 in FIGS. 1 and 2. Struts are used when a sign does not have a straight edge extending between the arms of the frame. Struts may be replaced by arms, although to do so would complicate the design of the frame, and add additional weight to the sign. It should be appreciated that in FIG. 10, the sign will not maintain an absolutely circular periphery, particularly when affected by wind, however the general outline of the web will be maintained by the provision of the struts.

FIG. 10 also includes an illuminated periphery, which is represented by light-producing elements 196, which extend about the periphery of web 171. Elements 196 may take the form of conventional light bulbs, or may be LEDs. A power supply and suitable electronic circuitry are provided (not shown) and may be contained in handle 179 to provide illumination for sign 170, and along with elements 196, comprise what is referred to herein as illumination means. Sign 170 may be of particular utility in night-time airport traffic management operations.

Returning again to FIG. 2, struts may be supported by the web of the sign in a number of ways. Web 28 includes facing elements 28F and 28R, for the front and rear faces of the sign, respectively, forming what is referred to herein as "sandwiched web construction." Struts 188 and 190 are depicted as being received in a sewn pocket 198, 200, respectively, which may be formed in one of the web facing elements, or formed as a pocket between the facing elements. Alternately, struts 192 and 194 are merely sandwiched in between the facing elements of web 28, which are fastened to one another by a heat seal or other form of adhesive. Struts and arms may have the web attached thereto by means of fasteners, such as thread or formed wire, or the web may be fastened on one side thereof by suitable adhesive. Struts may be formed of suitable metal or polymer/plastic materials.

Referring now to FIG. 11, a triangular sign is depicted generally at 204, and includes a frame 206 having a web 208 disposed there over. Frame 206 includes a hub 210 having web-support arms 212, 214 and 216 extending therefrom. Arm 214 is non-rotatably fixed to hub 210, while arms 212 and 216 are foldable on hub 210. A single leg 218 extends orthogonally from arms 212, 214 and 216, and may be folded to lie parallel and alongside fixed arm 214 when the sign is to be collapsed and stored.

Referring now to FIG. 12, a rectangular sign 220 is depicted. Sign 220 includes a frame 222 and a web 224 disposed there over. Web 224 is generally formed having a single side, although the previously described sandwich construction may also be used. In this embodiment, a sign-support arm 226 is non-rotatably fixed to a hub 227. Web-support arms 228, 230, 232 and 234 radiate from hub 227 and are received in web pockets 224a, 224b, 224c, and 224d. This sign configuration is particularly suitable for use as a real estate signage as the use of pockets in the web corners facilitate easy removal and replacement of a web as needed by the seller of the real estate. It will, of course, be noted that frame 222 is an inverted depiction of frame 26 of FIGS. 1–4. In this instance, sign-support arm 226 may be configured with a pointed free end, which is suitable for imbedding in the ground. Web 224 may be attached to frame 222 in any of the ways previously discussed herein. Web 224, in the embodiment depicted, is not attached to sign-support arm 226.

Particularly in the case where the sign is used for traffic control, but also in the case where it is desired to make the sign particularly effective for getting the attention of a passerby, the fabric of the web may be reflective, as may the lettering or indicia on the fabric, which reflective fabric and/or indicia comprise what is referred to herein as reflective means. One material which has been found to be particularly suited for the web is a 3M® product, identified by product nos. 8986 and 8987, which is Scotchlite™ Reflective Fabric in red-orange and lime-yellow, respectively. The 3M® product has reflective, wide-angle lenses bonded to a cloth backing. The colors are conspicuous under daylight conditions and are exceptionally reflective at night. The fabric has reflectivity values of approximately 175 foot candles per square foot of material. Another 3M® product, which is identified as Scotchlite™ Reflective Fabric 8960 in white is also suitable, particularly for providing lettering on signs constructed according to the invention and provides a reflectivity of 70–100 foot candles per square foot of fabric.

As may be expected, over a period of time, it is likely that the web of the sign will wear and need to be replaced. This may be easily done for the signs constructed according to the invention when the web includes pockets for receiving the from arms therein by collapsing the arms to one side of the hub and removing the web from the frame. In the case where handles are provided as sign supports, the handles must first be removed, and the web detached from the frame by pulling the web from the frame arms.

Although a number of embodiments of the invention have been described herein, it should be appreciated that yet further modifications may be made thereto without departing from the scope of the invention as defined in the appended claims.

Industrial Applicability

The signs of the invention are particularly well suited for warning signs to be used in connection with highway construction. Additionally, the signs of the invention are particular well suited where any temporary sign is required.

We claim:

1. A sign (20) comprising:
   a frame (26) having a hub (30) and plural arms, including web-support arms (46, 48, 50) and sign-support arms (42, 44), wherein said arms radiate from said hub (30), wherein said hub (30) is divided into two regions about a midline (80) and wherein at least some of said web-support arms radiate from said hub (30) on either side of said midline (80);
   a web (28) disposed over said frame (26) and secured thereto;
   wherein a support (52) for the sign is attached at the end of at least one of said sign-support arms (42, 44); and
   wherein at least some of said arms (42, 44, 46, 50) include a hinge element (42H, 44H, 46H, 50H) which is rotatably mounted about a pivot point (38P, 40P) on said hub (30), wherein said hinge element (46H) for said web-support arm (46) and said hinge element (42H) for said sign-support arm (42) on one side of said midline share a pivot point (38P) and said hinge element (50H) for said web-support arm (50) and said hinge element (44H) for said sign-support arm (44) on the other side of said midline share a second pivot point (40P).

2. The sign of claim 1 which further includes struts (188, 190, 192, 194) disposed on said web (28) wherein said struts are fully supported by said web.

3. The sign of claim 1 wherein said hub (30) includes hinge pivot means (38, 40) for receiving said hinge elements.

4. The sign of claim 1 wherein at least one of said arms (48) is fixed to said hub (30).

5. The sign of claim 1 wherein said support (52) is a handle (53) and is collapsibly fixed to a sign-support arm (42, 44) and is shiftable between an extended position and a collapsed position.

6. The sign of claim 5 wherein said handle (53) is hinged to a free-end of a sign-support arm (42, 44).

7. The sign of claim 6 which includes means for locking (44D, 68) said handle (53) in said extended position to said sign-support arm.

8. The sign of claim 1 wherein said hinge elements (108H, 112H) for said web-support arms (108, 112) share a pivot point (114P) and said hinge elements (100H, 102H) for said sign-support arms (100, 102) are rotatably mounted about other pivot points (104P, 106P).

9. The sign of claim 1 wherein said arms are offset from the pivot point of said arm hinge elements.

10. The sign of claim 1 wherein said web (28) includes reflective means for providing a reflective surface on said web.

11. The sign of claim 1 wherein said web includes illumination means (198) for providing an illuminated sign.

12. The sign of claim 1 wherein said web (28) includes a pair of facing elements (28F, 28R) and wherein said frame (26) is at least partially sandwiched inbetween said facing elements.

13. A sign comprising:
    a frame (26) having a hub (30) with a midline (80) extending therethrough and plural arms (42, 44, 46, 48, 50), wherein said arms radiate from said hub (30) with at least some of said arms radiating from either side of said midline (80) and include web-support arms (46, 48, 50) and sign-support arms (42, 44), wherein at least some of said arms (42, 44, 46, 50) include a hinge element (42H, 44H, 46H, 50H) which is rotatably mounted about a pivot point (38P, 40P) on said hub (30); and wherein said hub includes hinge pivot means (38, 40) for receiving said hinge elements, said pivot means being located on either side of said midline;
    wherein said hinge elements for said web-support arms share a pivot point located on opposite sides of said midline, and said hinge elements for said sign-support arms are rotatably mounted about other pivot points;
    a web (28) disposed over said frame and secured thereto; and
    a support (52) for the sign.

14. The sign of claim 13 which further includes struts (188, 190, 192, 194) disposed on said web (28) wherein said struts are fully supported by said web.

15. The sign of claim 13 wherein at least one of said arms (48) is fixed to said hub (30).

16. The sign of claim 13 wherein said web is divided into two portions about a vertical midline (80), and wherein said hinge element (46H) for said web-support arm (46) and said hinge element (42H) for said sign-support arm (42) on one side of said midline share a pivot point (38P) and said hinge element (50H) for said web-support arm (50) and said hinge element (44H) for said sign-support arm (44) on the other side of said midline share a second pivot point (40P).

17. The sign of claim 13 wherein said arms are offset from the pivot point of said arm hinge elements.

18. The sign of claim 13 wherein said web (28) includes a pair of facing elements (28F, 28R) and wherein said frame is at least partially sandwiched inbetween said facing elements.

* * * * *